United States Patent
Cho et al.

(10) Patent No.: US 10,644,549 B2
(45) Date of Patent: May 5, 2020

(54) BRUSHLESS DIRECT CURRENT MOTOR

(71) Applicant: Hanon Systems, Daejeon (KR)

(72) Inventors: Seong Kook Cho, Daejeon (KR); Sang Hun Kim, Daejeon (KR); Kyung Hun Jung, Daejeon (KR); Min Gyo Jung, Daejeon (KR); Jae Kyoung Jin, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/780,479

(22) PCT Filed: May 4, 2017

(86) PCT No.: PCT/KR2017/004716
§ 371 (c)(1),
(2) Date: May 31, 2018

(87) PCT Pub. No.: WO2018/030611
PCT Pub. Date: Feb. 15, 2018

(65) Prior Publication Data
US 2019/0157929 A1    May 23, 2019

(30) Foreign Application Priority Data

Aug. 11, 2016  (KR) ........................ 10-2016-0102390
Apr. 27, 2017  (KR) ........................ 10-2017-0054128

(51) Int. Cl.
*H02K 1/27*    (2006.01)
*H02K 29/08*   (2006.01)
(Continued)

(52) U.S. Cl.
CPC ............. *H02K 1/2713* (2013.01); *H02K 3/20* (2013.01); *H02K 3/34* (2013.01); *H02K 3/52* (2013.01);
(Continued)

(58) Field of Classification Search
CPC .......... H02K 7/14; H02K 9/06; H02K 11/215; H02K 2211/03
(Continued)

(56) References Cited

U.S. PATENT DOCUMENTS

2001/0033113 A1*  10/2001  Takano .................. B62D 5/064
                                                     310/67 R
2007/0252541 A1   11/2007  Hazelton et al.
(Continued)

FOREIGN PATENT DOCUMENTS

JP    2003-333818 A    11/2003
KR    10-0930011 B1    12/2009
(Continued)

OTHER PUBLICATIONS

International Search Report issued in PCT/KR2017/004716 dated Aug. 11, 2017.

*Primary Examiner* — Quyen P Leung
*Assistant Examiner* — Minki Chang
(74) *Attorney, Agent, or Firm* — Fulbright and Jaworski LLP; James Crawford

(57) ABSTRACT

BLDC motor including a stator with teeth which extend toward an inner side of a core and have a coil wound therearound; rotors disposed at an inner side of the stator and spaced apart from each other having a plurality of permanent magnets coupled to a core thereof; and hall sensors disposed and spaced apart to be opposite to an outer circumferential surface of the core of the rotor and disposed within a height range between both surfaces in a height direction of the core of the rotor to detect a change in a magnetic field in response to a rotation of the rotor, thereby accurately grasping positional information of a rotor and accurately controlling a rotation of the rotor by transmitting a magnetic flux generated from a permanent magnet of the rotor to a hall sensor (Continued)

enabling the hall sensor to detect a change in a magnetic field.

11 Claims, 11 Drawing Sheets

(51) Int. Cl.
  *H02K 11/215* (2016.01)
  *H02K 3/20* (2006.01)
  *H02K 3/34* (2006.01)
  *H02K 3/52* (2006.01)
  *H02K 7/14* (2006.01)
(52) U.S. Cl.
  CPC ............ *H02K 7/14* (2013.01); *H02K 11/215* (2016.01); *H02K 29/08* (2013.01)
(58) Field of Classification Search
  USPC .................................. 310/66, 179, 216.001
  See application file for complete search history.

(56) References Cited

U.S. PATENT DOCUMENTS

| | | | | |
|---|---|---|---|---|
| 2013/0270932 | A1* | 10/2013 | Hatfield | H02K 3/522 310/50 |
| 2015/0069864 | A1* | 3/2015 | Nagahama | H02K 29/08 310/50 |
| 2016/0056692 | A1* | 2/2016 | Suzuki | H02K 29/08 310/68 B |
| 2017/0133906 | A1* | 5/2017 | Pfeiffer | H02K 5/1732 |
| 2017/0288509 | A1* | 10/2017 | Oya | H02K 11/00 |

FOREIGN PATENT DOCUMENTS

| | | |
|---|---|---|
| KR | 10-1336472 B1 | 12/2013 |
| KR | 10-1406207 B1 | 6/2014 |
| KR | 2016-0011920 A | 2/2016 |

* cited by examiner (10-POLE ROTOR)

(8-POLE ROTOR)

BRUSHLESS DIRECT CURRENT MOTOR

This application is a § 371 of International Application No. PCT/KR2017/004716 filed May 4, 2017, and claims priority from Korean Patent Application Nos. 10-2016-0102390 filed Aug. 11, 2016 and 10-2017-0054128 filed Aug. 27, 2017.

TECHNICAL FIELD

The present invention relates to a brushless direct current (BLDC) motor, and more particularly, to a BLDC motor capable of controlling a motor by receiving positional information of a rotor rotated from a hall sensor mounted on a stator side.

BACKGROUND ART

A brushless direct current (BLDC) motor may prevent friction and wear which are disadvantages of the existing DC motor and have relatively high efficiency. Therefore, recently, hybrid cars tend to adopt the BLDC motor as a motor for rotating a cooling fan.

The BLDC motor is a motor that does not have a brush and a commutator necessary for a DC motor but has an electronic commutation mechanism installed therein. Among the BLDC motors, an inner-rotor type BLDC motor includes a rotor and a stator, in which the rotor whose center is provided with a permanent magnet rotates and the stator whose circumference is wound with a drive coil is fixed. That is, the stator whose outer side is wound with the drive coil is fixed and the rotor whose inner side is provided with the permanent magnet rotates.

As illustrated in FIGS. 1 and 2, the conventional inner-rotor type BLDC motor 1 includes a stator 30 fixed to an inner side of the housing 10 and rotors 20 disposed therein at a predetermined interval. The stator 30 which has a ring shape is provided with a plurality of teeth 31 which are protruded and formed radially inwardly. An upper part and a lower part of the stator 30 are coupled to insulators 40 in a form in which the insulators 40 surround the stator 30 to insulate the stator 30, and a drive coil 60 is wound around the teeth 31 of the stator 30 insulated by the insulator 40. In addition, a plurality of permanent magnets 21 which are arranged to be spaced apart from each other along a circumferential direction are coupled to the rotor 20.

In this case, the stator 30 is provided with a hall sensor 50 which detects a magnetic field generated from the rotor 20 to be able to determine a position of the rotating rotor 20, in which three hall sensors 50 are disposed to be able to detect three hall signals formed by the magnetic field generated from the rotor and having a phase difference of 120°.

The hall sensor 50 is a sensor which is operated by being applied with the magnetic field generated from the rotor 20. As illustrated in FIG. 2, an overhang structure in which an upper end of a core of the rotor 20 is disposed above an upper end of a core of the stator 30 is formed, and thus the hall sensor 50 is disposed to detect a change in the magnetic field in response to the rotation of the rotor 20.

Here, the hall sensor detects the change in the magnetic field at the time of the rotation of the rotor to identify a position signal of the rotor. Meanwhile, the hall sensor does not often accurately detect the change in the magnetic field to fail to identify the position information of the rotor, and therefore the motor may not be accurately controlled or even the driving of the driving may stop.

That is, if the overhang part of the rotor is not sufficient, the magnetic flux generated from the permanent magnet of the rotor is not sufficiently transmitted to the hall sensor, such that the hall sensor may not accurately detect the change in the magnetic field.

RELATED ART DOCUMENT

Patent Document

KR 10-1336472 B1 (2013.11.27)

DISCLOSURE

Technical Problem

An object of the present invention is to provide a BLDC motor capable of accurately identifying positional information of a rotor and accurately controlling a rotation of the rotor by sufficiently transmitting a magnetic flux generated from a permanent magnet of the rotor to a hall sensor to enable the hall sensor to accurately detect a change in a magnetic field.

Technical Solution

In one general aspect, a BLDC motor includes: a stator 100 provided with a plurality of teeth 120 which extend toward an inner side of a core 110 and have a coil 140 wound therearound; rotors 200 disposed at an inner side of the stator 100 to be spaced apart from each other and having a plurality of permanent magnets 220 coupled to a core 210 thereof; and hall sensors 300 disposed while being spaced apart from each other to be opposite to an outer circumferential surface 211 of the core 210 of the rotor 200 and disposed within a height range between both surfaces in a height direction of the core 210 of the rotor 200 to detect a change in a magnetic field in response to a rotation of the rotor 200.

A central height of the core 210 of the rotor 200 may be spaced apart from a central height of the core 110 of the stator 100.

The central height of the core 210 of the rotor 200 may be disposed to be spaced apart from the central height of the core 110 of the stator 100 in the same direction as the direction of the axial force which acts on the rotor 200 by a fan 400 which rotates while being coupled to the rotation shaft 230 of the rotor 200.

The core 110 of the stator 100 may be disposed within the height range between both surfaces in the height direction of the core 210 of the rotor 200.

The BLDC motor may further include: an insulator 150 coupled to the stator 100 so that the insulator 150 surrounds the stator 100 to electrically insulate the stator 100, in which the insulator 150 may be provided with a seating groove 151 in which the hall sensor 300 may be disposed.

The BLDC motor may further include: hole PCB housings 310 which are disposed at the outer side of the coil 140 in the height direction to be spaced apart from each other and are coupled to the insulator 150.

The BLDC motor may further include: a hole PCB 320 which is coupled to the outer side of the hole PCB housing 310 in the height direction and is provided with the hall sensor 300.

A stopping plate 311 may be provided to stop a gap between the outer circumferential surface 211 of the core 210 of the rotor 200 and the hall sensor 300.

The stopping plate 311 may be integrally formed with the hole PCB housing 310.

Ten permanent magnets 220 may be spaced apart from each other by a predetermined angle along the circumferential direction, so the rotor 200 is formed in 10 poles, and three hall sensors 300 may be spaced apart from each other by 24° along the circumferential direction.

Eight permanent magnets 220 may be spaced apart from each other by a predetermined angle along the circumferential direction, so the rotor 200 is formed in 8 poles, and three hall sensors 300 may be spaced apart from each other by 30° along the circumferential direction.

Advantageous Effects

According to the exemplary embodiment of the present invention, the BLDC motor can sufficiently transmit the magnetic flux generated from the permanent magnet of the rotor to the hall sensor to enable the hall sensor to accurately detect the change in the magnetic field, thereby accurately controlling the rotation of the rotor.

BEST MODE

Hereinafter, a BLDC motor according to an exemplary embodiment of the present invention having a configuration as described above will be described in detail with reference to the accompanying drawings.

Figure 1:
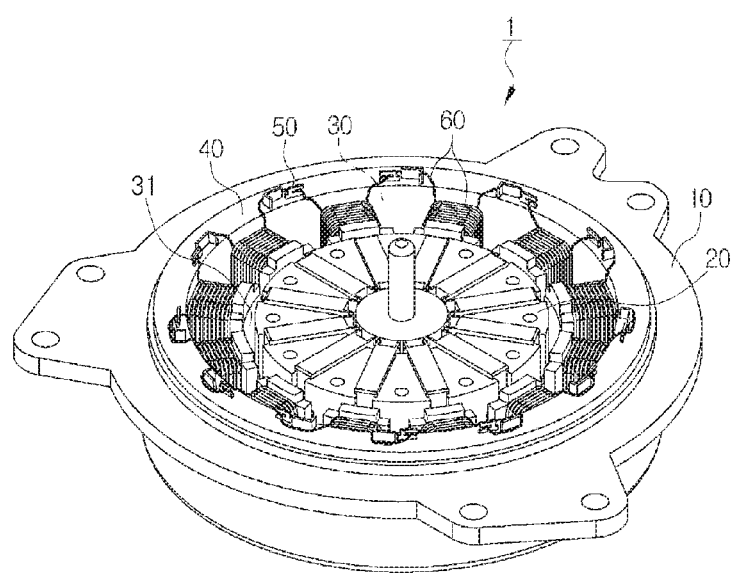
FIGS. 1 and 2 are a perspective view and a schematic cross-sectional view of a conventional BLDC motor equipped with a hall sensor.
Figure 2:
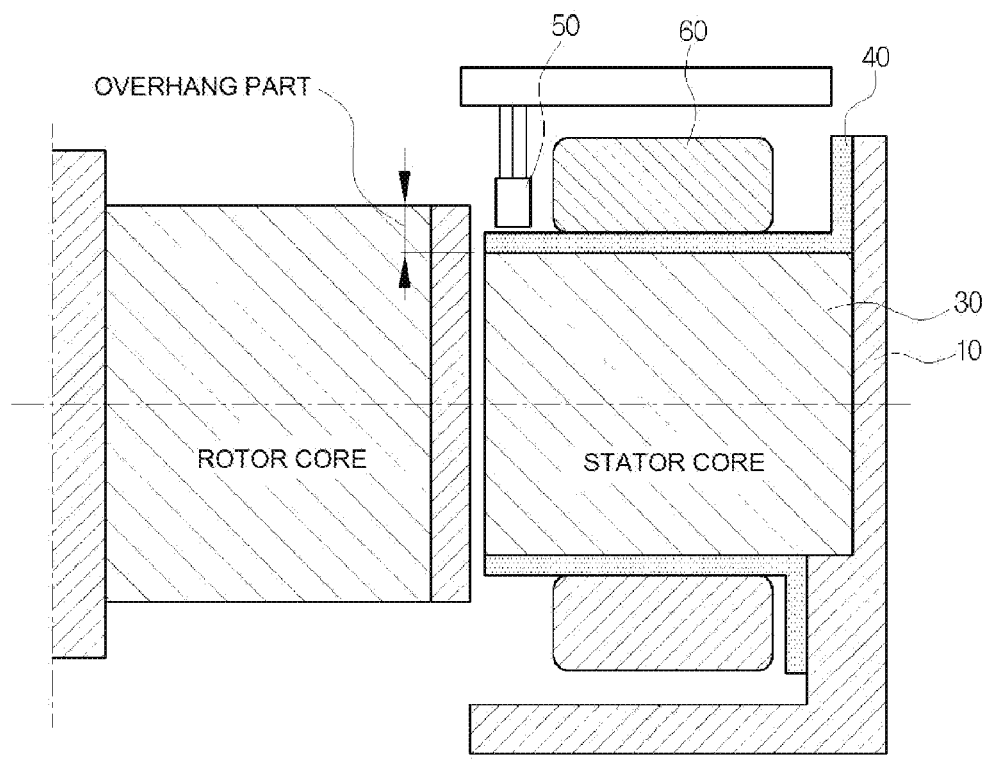
Figure 3:
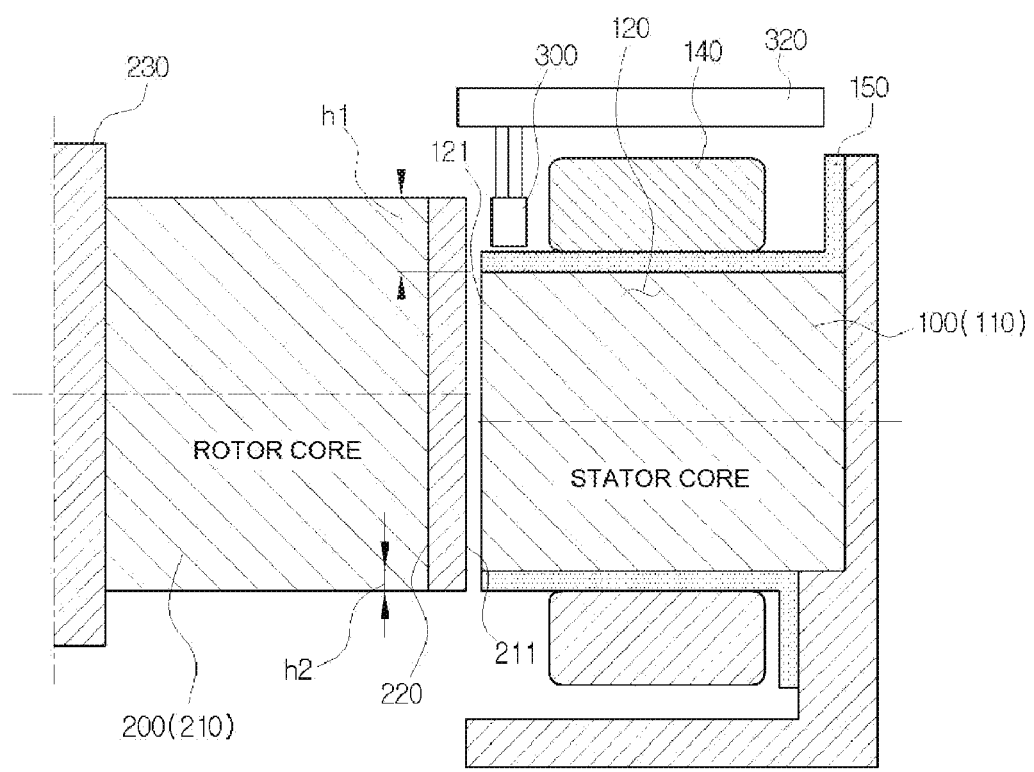
FIG. 3 is a schematic cross-sectional view illustrating a BLDC motor according to an exemplary embodiment of the present invention.
Figure 4:
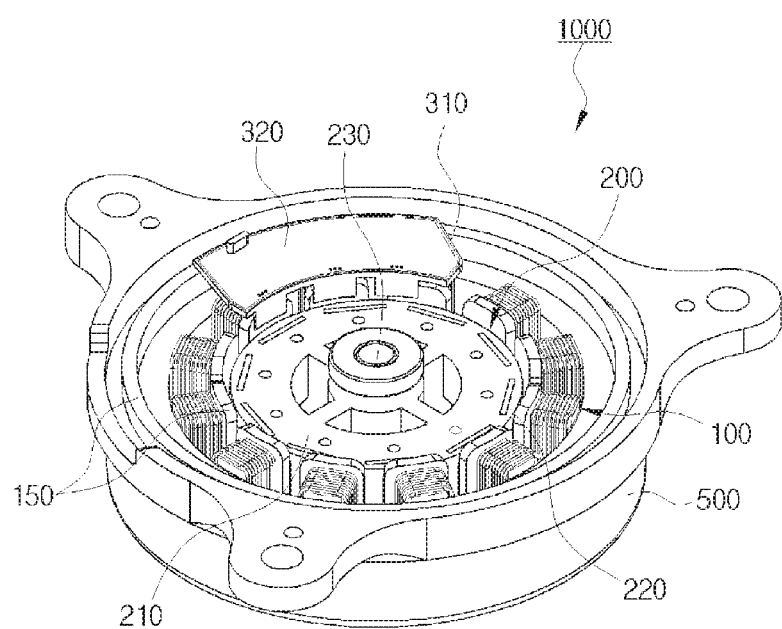
FIG. 4 is an assembled perspective view illustrating the BLDC motor according to the exemplary embodiment of the present invention.

FIG. 3 is a schematic cross-sectional view illustrating a BLDC motor according to an exemplary embodiment of the present invention and FIG. 4 is an assembled perspective view illustrating the BLDC motor according to the exemplary embodiment of the present invention.

As illustrated, a BLDC motor 1000 according to an exemplary embodiment of the present invention includes: a stator 100 provided with a plurality of teeth 120 which extend toward an inner side of a core 110 and have a coil 140 wound therearound; rotors 200 disposed at an inner side of the stator 100 to be spaced apart from each other and having a plurality of permanent magnets 220 coupled to a core 210 thereof; and hall sensors 300 disposed while being spaced apart from each other to be opposite to an outer circumferential surface 211 of the core 210 of the rotor 200 and disposed within a height range between both surfaces in a height direction of the core 210 of the rotor 200 to detect a change in a magnetic field in response to a rotation of the rotor 200.

First of all, the stator 100 is provided in a housing 500 in which a receiving space is formed and may be coupled to an inner side of the housing 500 to be fixed. At this time, the stator 100 is provided with the plurality of teeth 120 which radially extend to an inner side of the cylindrical core 110, and the teeth 120 may be arranged in the circumferential direction to be spaced apart from each other. In addition, inner end parts of the teeth 120 may be provided with T shoes which may extend in a circumferential direction from circumferential side surfaces of each tooth 120. At this time, the T shoe may extend from both side surfaces of an end part of one tooth 120, and thus a pair of T shoes may be formed to extend from one tooth 120. In addition, a radial inner side surface of the teeth 120 and the T shoes has an arch shape, and lines connecting between an inner circumferential surface 121 of the plurality of teeth 120 and an inner circumferential surface of the T shoes may be formed in a circular shape. In addition, the T shoes which are formed on the teeth 120 adjacent to each other and are opposite to each other may be formed to be spaced apart from each other at a predetermined interval. In addition, the coil 140 may be wound around the teeth 120, and the coil 140 may be wound around the teeth 120 to surround both surfaces in a height direction and both surfaces in a circumferential direction of the teeth 120.

The rotor 200 may be disposed at a hollow part at a center of the inner side of the stator 100 and may be spaced apart from the inner circumferential surface 121 in the radial direction of the teeth 120 and the T shoes. At this time, the rotor 200 is coupled to a rotation shaft 230 so that both ends of the rotation shaft 230 can rotate by being coupled to the housing 500 of the motor by a bearing 240, a bush or the like. In addition, the rotor 200 may be provided with a plurality of permanent magnets 220 which are coupled to the core 210 having a cylinder shape or a cylindrical shape. At this time, the permanent magnets 220 may be slightly spaced apart from each other toward a radial inner side from the outer circumferential surface 211 of the core 210 along the circumferential direction. For example, each permanent magnet 220 has a straight shape and is disposed to be opposite to each other so that the end parts of neighboring permanent magnets 220 are adjacent to each other, such that a line connecting between the radial outer sides of the plurality of permanent magnets 220 are formed in a circle. The core 210 may be formed in a form in which a plurality of grooves are arranged in a circumferential direction so that the permanent magnet 220 may be inserted into the grooves and coupled thereto. In addition, the permanent magnets 220 have an N pole and an S pole, in which one permanent magnet is disposed so that the N pole is positioned at a radial outer side and the neighboring permanent magnets are disposed so that the S pole is positioned outside, such that the plurality of permanent magnets may be alternately arranged along the circumferential direction in such a manner that the positions of the N poles and the S poles are changed.

For example, the stator 100 may have twelve teeth 120, and the rotor 200 may include ten permanent magnets 220 to form ten poles.

The hall sensor 300 is a sensor for detecting a magnetic field generated from the permanent magnet 220 of the rotor 200 to determine a position of the rotating rotor 200 and may be fixedly installed to the stator 100. At this time, three hall sensors 300 may be disposed to be able to detect three hall signals which are formed by the magnetic field generated from the rotor 200 and have a phase difference of 120°, and as illustrated, three hall sensors 300 may be spaced apart from each other at a predetermined interval along a circumferential direction. The hall sensor 300 is disposed to face the outer circumferential surface 211 of the core 210 of the rotor 200 and may be spaced apart from the outer circumferential surface 211 of the core 210. In addition, the hall sensor 300 is disposed within a height range between an upper surface and a lower surface of the core 210 which are both side surfaces in a height direction so that a magnetic flux generated from the permanent magnet 220 of the rotor 200 may be sufficiently transmitted to the hall sensor. Therefore, the hall sensor can accurately detect the change of the magnetic field.

That is, the hall sensor 300 is disposed within a height range of an overhang part h1 of the rotor which is a part where the upper surface or lower surface of the core 210 of the rotor 200 is formed to protrude in a height direction from an upper surface or a lower surface of the core 110 of the stator 100, such that the hall sensor can accurately detect the change in the magnetic flux.

In this way, the BLDC motor according to the exemplary embodiment of the present invention can sufficiently transmit the magnetic flux generated from the permanent magnet of the rotor to the hall sensor to enable the hall sensor to accurately detect the change in the magnetic field, thereby accurately controlling the rotation of the rotor.

In addition, a central height of the core 210 of the rotor 200 may be spaced apart from a central height of the core 110 of the stator 100.

In the conventional BLDC motor, the central height of the core of the rotor and the central height of the core of the stator coincide with each other, but in the BLDC motor of the present invention, the central height of the core 210 of the rotor 200 is spaced apart from the central height of the core 110 of the stator 100. Accordingly, the present invention uses the same stator core and core of the rotor as the conventional BLDC motor so that only the central position in the height direction of the core of the rotor is spaced apart from the center in the height direction of the stator without increasing a height dimension of the core of the rotor. As a result, a dimension of the overhang part h1 at one side in the height direction is relatively large and an overhang part h2 at the other side is relatively small, such that a side where the overhang part h1 at one side is formed may be provided with the hall sensor 300. Here, since the hall sensor may not be formed to be equal to or smaller than a specific size, the central position in the height direction of the core of the rotor is adjusted so that the hall sensor may completely face the outer circumferential surface of the core of the rotor.

Thus, the BLDC motor according to the exemplary embodiment of the present invention can use the core of the rotor having the same size as that of the conventional BLDC motor, such the sensing accuracy of the hall sensor can be improved without more increasing the weight as compared with the related art.

In addition, the central height of the core 210 of the rotor 200 may be spaced apart from the central height of the core 110 of the stator 100 in the same direction as the force in the direction of the rotation shaft which acts on the rotor 200 by a fan 400 which rotates while being coupled to the rotation shaft 230 of the rotor 200.

That is, the core 210 of the rotor 200 may be coupled to the rotation shaft 230 which may be rotatably coupled to the housing 500 by the bearing 240, and the fan may rotate while being coupled to the rotation shaft 230. At this time, if the fan rotates, a force may act in the axial direction of the rotation shaft 230, which may cause a load to act on the bearing 240 supporting the rotation shaft 230. In addition, if the central height of the core 210 of the rotor 200 is spaced apart from the central height of the core 110 of the stator 100, the axial force acts so that the center in the height direction of the core of the rotor coincides with the center in the height direction of the core of the stator by the magnetic field. Therefore, the direction of the axial force by the rotation of the fan and the direction of the axial force in which the core of the rotor moves by the magnetic field are opposite to each other so that the forces are offset from each other, thereby reducing the load applied to the bearing 240 supporting the rotation shaft 230.

In addition, the core 110 of the stator 100 may be disposed within the height range between both surfaces in the height direction of the core 210 of the rotor 200.

That is, the central height of the core 210 of the rotor 200 is spaced apart from the central height of the core 110 of the stator 100, and the overhang parts h1 and h2 are formed on both sides of the core 210 of the rotor 200 to reduce a leakage magnetic flux.

In addition, the BLDC motor further includes an insulator 150 coupled to the stator 100 so that the insulator 150 surrounds the stator 100 to electrically insulate the stator 100, and the insulator 150 is provided with a seating groove 151 in which the hall sensor 300 may be disposed.

Figure 5:
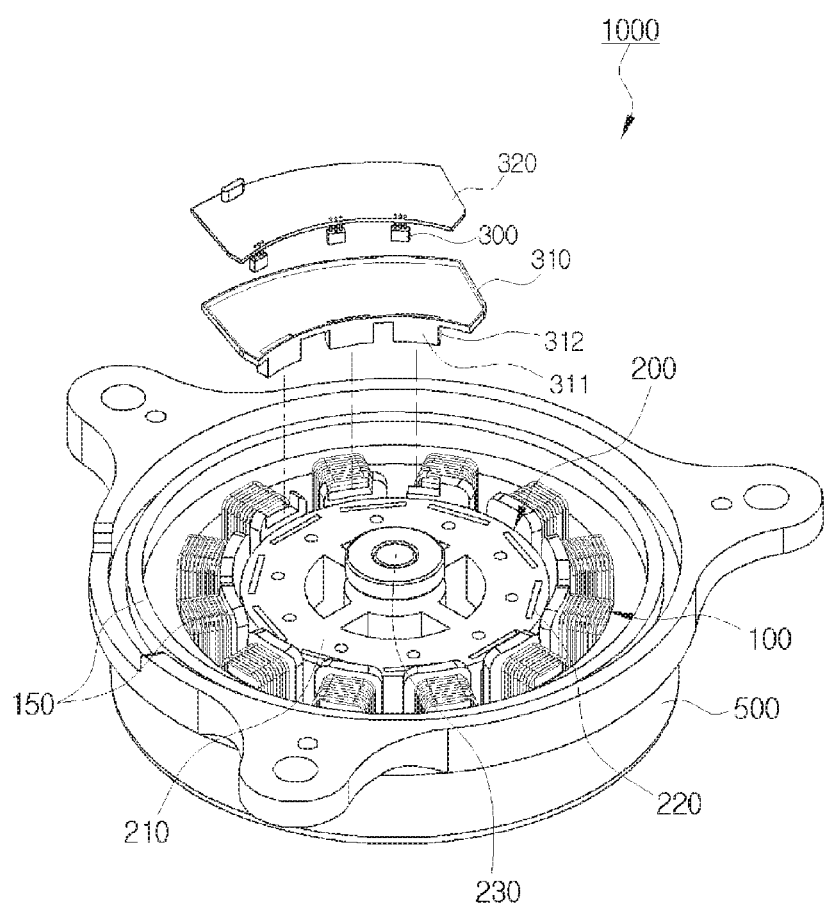
FIG. 5 is an exploded perspective view of a hole PCB housing and a hole PCB portion according to an exemplary embodiment of the present invention.
Figure 6:
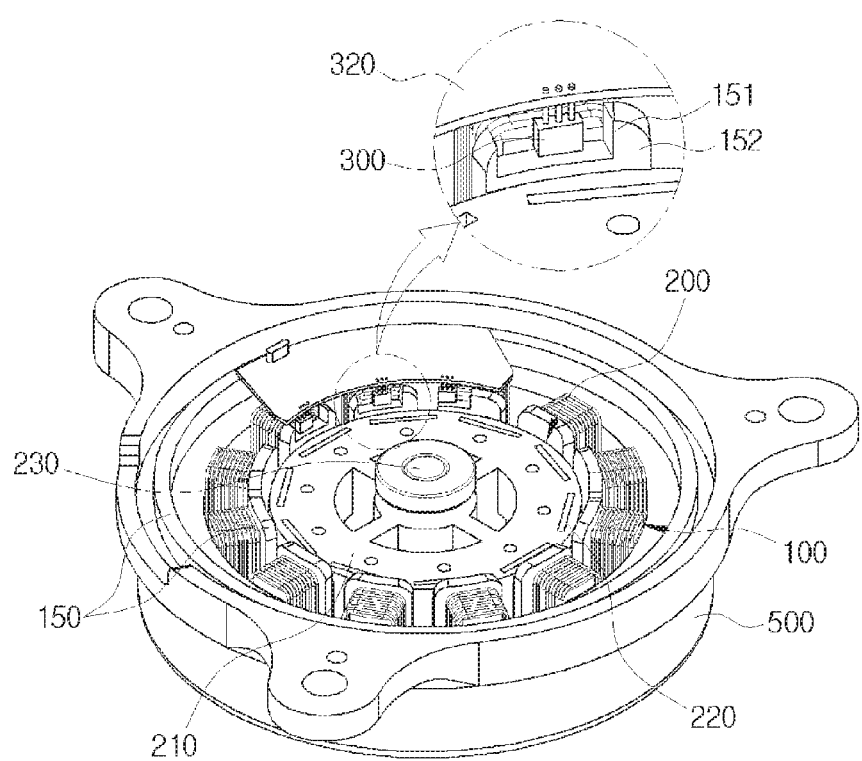
FIG. 6 is an assembled perspective view of a state in which the hole PCB housing according to the exemplary embodiment of the present invention is removed.
Figure 7:
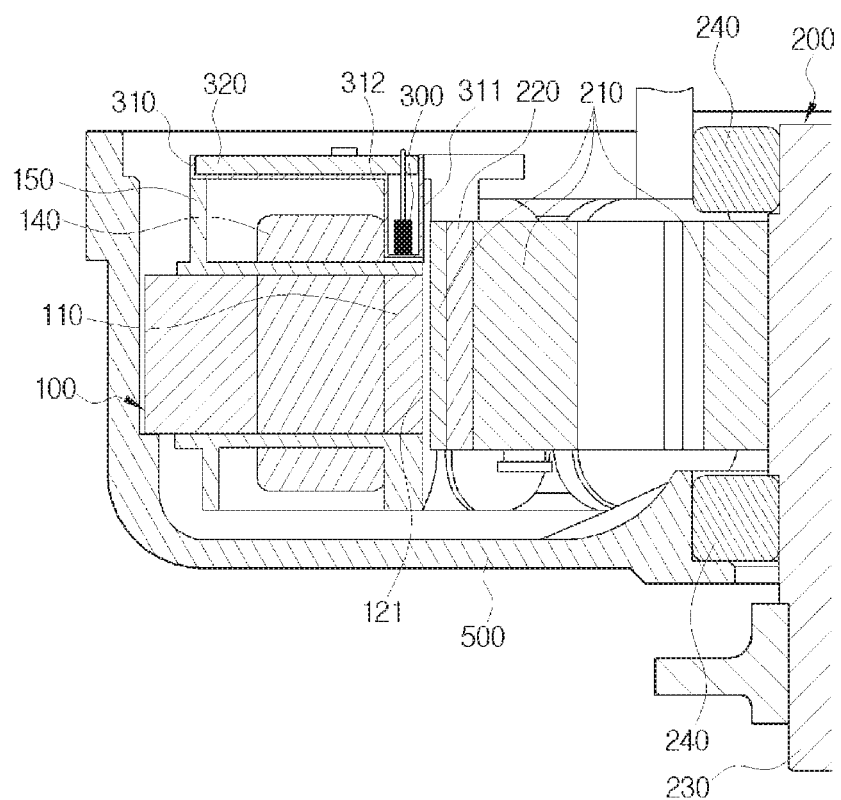
FIG. 7 is a cross-sectional view illustrating the BLDC motor according to the exemplary embodiment of the present invention.
Figure 8:
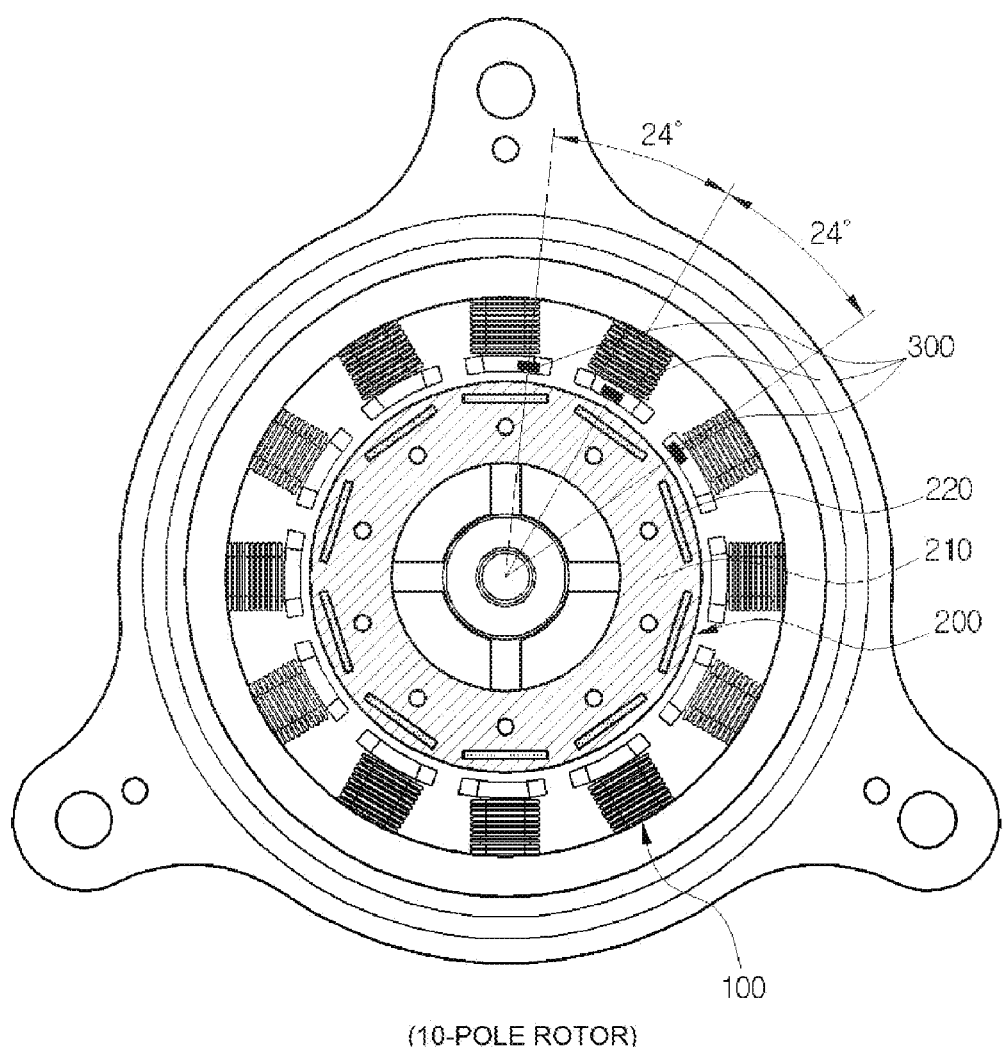
FIGS. 8 and 9 are a top plan view and a conceptual diagram illustrating a disposition of a 10-pole rotor and hall sensors according to an exemplary embodiment of the present invention.
Figure 9:
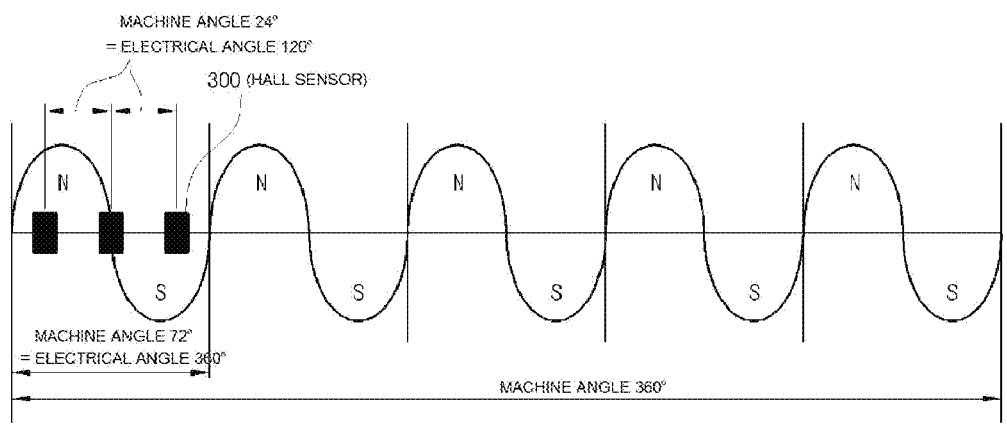
Figure 10:
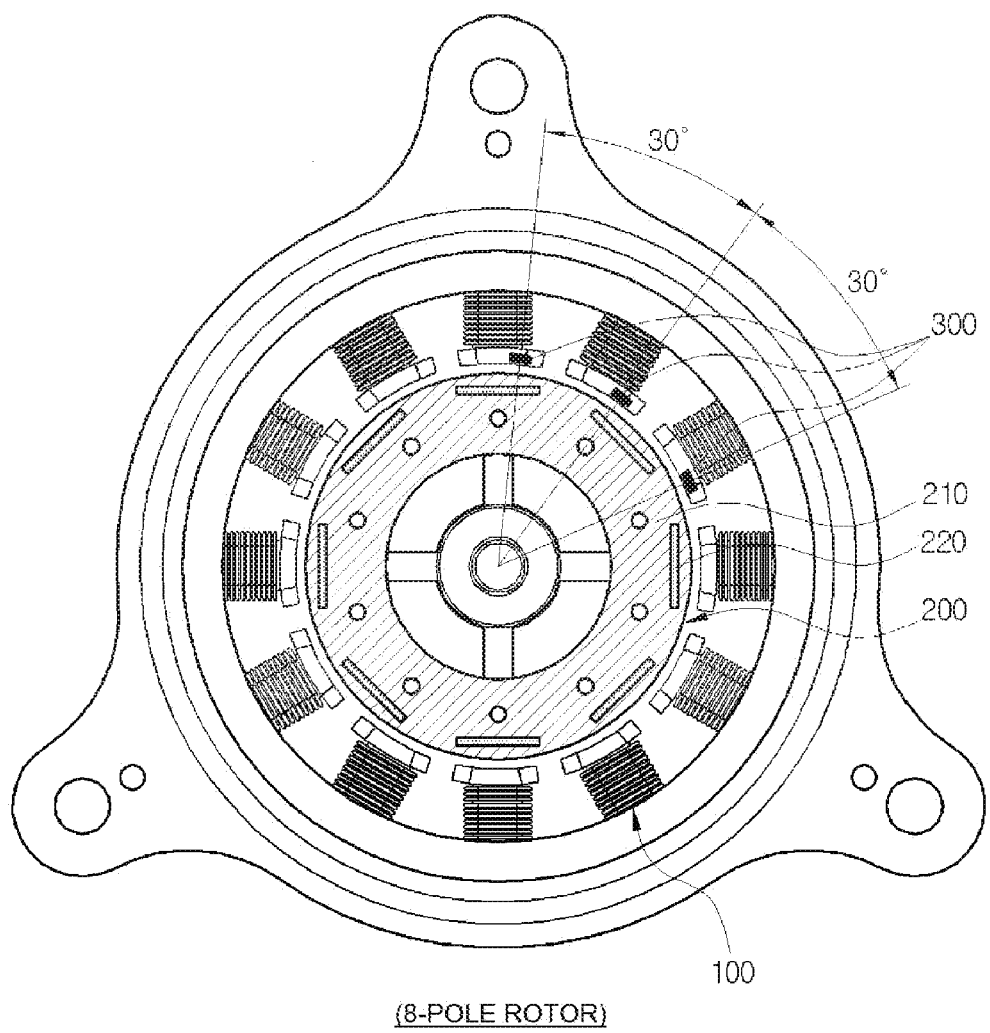
FIGS. 10 and 11 are a top plan view and a conceptual diagram illustrating a disposition of a 8-pole rotor and hall sensors according to an exemplary embodiment of the present invention.
Figure 11:
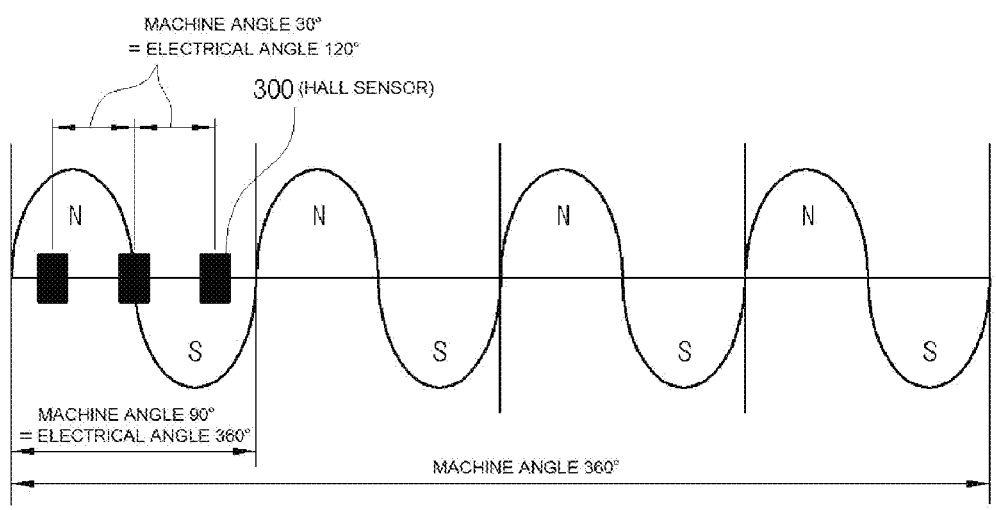

At this time, the insulator 150 which is a portion coupled to the stator 100 for the purpose of an electrical insulation is made of an insulating material and may be coupled to the stator 100 to surround a part of the core 110 of the stator 100 and upper and lower surfaces and both side surfaces of the teeth 120. The coil 140 may be wound around an outer side of the insulator 150. At this time, as illustrated in FIGS. 4 to 6, the insulator 150 may be provided with an extension 152 which more extends from an end part inside the teeth toward an outer side (upper part) in a height direction than the height of the coil 140, and may be provided with the seating groove 151 having a form in which a part of the extension 152 is removed so that the hall sensor 300 may be disposed in the seating groove 151. In addition, the seating groove 151 may be formed in various other forms.

Therefore, a space in which the hall sensor 300 may be disposed may be easily formed.

In addition, the BLDC motor may further include a hole PCB housing 310 which is disposed at the outer side of the coil 140 in the height direction to be spaced apart from the coil 140 and is coupled to the insulator 150.

That is, the hole PCB housing 310 may be disposed at the outer side (in drawings, upper part of the coil) of the coil 140 in the height direction to be spaced apart from the coil 140, and the hole PCB housing 310 may be configured so that an outer part and an inner part in a radial direction thereof are supported on the insulator 150 and the outer part in the radial direction thereof is fixedly coupled to the insulator 150 by a fastening means. In addition, the hole PCB housing 310 may be provided with a groove recessed downward from the upper surface thereof, and may be provided with holes through which the hall sensor 300 may penetrate vertically.

In addition, the BLDC motor may further include a hole PCB 320 which is coupled to the outer side of the hole PCB housing 310 in the height direction and is provided with the hall sensor 300.

That is, in the drawings, the hole PCB 320 may be coupled to the upper part of the hole PCB housing 310, and the hole PCB 320 may be provided with the hall sensors 300. The hall sensors 300 may be disposed on the lower part while being connected to the hole PCB 320. Therefore, the hall sensors 300 may be disposed in the seating groove 151 of the insulator 150 penetrating through the holes formed on the hole PCB housing 310, and the hole PCB 320 may be seated to be inserted into the groove formed on the hole PCB housing 310 and the hole PCB 320 may be fixedly coupled to the hole PCB housing 310 by the fastening means or the like.

Here, the lower part of the hole PCB housing 310 may be provided with an insertion 312 so that the hole PCB housing 310 is inserted into the seating grooves 151 formed on the insulator 150, and is formed in a groove shape in which the insertion inserted into the seating groove 151 is depressed downwardly from above. Here, the groove may be provided with the hall sensor 300. Thus, the hole PCB 320 on which the hall sensors 300 are mounted may be assembled to the hole PCB housing 310 and then the hole PCB housing 310 may be assembled to the insulator 150.

In addition, a stopping plate 311 may be provided to block a gap between the outer circumferential surface 211 of the core 210 of the rotor 200 and the hall sensor 300.

That is, as illustrated, the stopping plate 311 may prevent the hall sensor 300 from being influenced by the air flow due to the rotation of the core 210 of the rotor 200, and may be spaced apart from the core 210 of the rotor 200 to stop the opened inner side surface in the radial direction of the seating groove 151 of the extension 152 of the insulator 150. At this time, the stopping plate 311 may be variously coupled to the hole PCB housing 310, the insulator 150, or the like or may be integrally formed with the insulator 150.

In addition, the stopping plate 311 may be integrally formed with the hole PCB housing 310.

That is, the stopping plate 311 is integrally formed with the hole PCB housing 310 so that the stopping plate 311 may be easily disposed and fixed. As described above, when the lower part of the hole PCB housing 310 is provided with the insertion so that the hole PCB housing 310 is inserted into the seating grooves 151 formed on the insulator 150, one surface of the insertion may be the stopping plate 311.

If the hall sensor 300 is disposed in the insertion of the hole PCB housing 310, the hall sensor may not be affected by flowing air, and the hall sensor may be protected from dust or foreign matter.

In addition, ten permanent magnets 220 are spaced apart from each other by a predetermined angle along the circumferential direction, so the rotor 200 is formed in 10 poles, and three hall sensor 300 may be spaced apart from each other by 24° along the circumferential direction.

That is, as described above, in the rotor 200, the permanent magnets 220 which are positioned near the radial outer side of the core 210 may be spaced apart from each other at a predetermined interval along the circumferential direction, 10 permanent magnets 220 may be spaced apart from each other by a predetermined angle along the circumferential direction with respect to the rotating center of the rotor, an N pole of one permanent magnet may be disposed at the radial outer side and an S pole thereof may be disposed at the radial inner side, S poles of neighboring permanent magnets may be disposed at the radial outer side and N poles thereof may be disposed at the radial inner side, and the permanent magnets are alternately disposed in the form in which the positions of the N pole and the S pole are changed along the circumferential direction so that the rotor 200 may be formed in 10 poles.

In this configuration, three hall sensors 30 may be spaced apart from each other by 24° with respect to the rotating center of the rotor along the circumferential direction. That is, a period in which one permanent magnet having an N pole disposed at an outer side and one permanent magnet having an S pole disposed at an outer side pass while the rotor 200 rotates 360° as a machine angle is repeated five times, a machine angle for one-time period of the 10-pole rotor becomes 360°/5=72°, and the machine angle of 72° for the one-time period corresponds to an electrical angle of 360°. Therefore, the machine angle of three hall sensors 300 disposed at a phase difference of 120° as an electrical angle with respect to the electrical angle of 360° may be 24°, so three hall sensors 300 may be spaced apart from each other by 24° in the circumferential direction.

In addition, eight permanent magnets 220 are spaced apart from each other by a predetermined angle along the circumferential direction, so the rotor 200 is formed in 8 poles, and three hall sensor 300 may be spaced apart from each other by 300 along the circumferential direction.

That is, as described above, the permanent magnet is formed in 8, so the rotor 200 may be formed in 8 poles, 8 permanent magnets 220 may be spaced apart from each other by a predetermined angle along the circumferential direction with respect to the rotation center of the rotor, and similar to the 10-pole rotor, the plurality of permanent magnets are alternately disposed along the circumferential direction in the form in which the positions of the N poles and the S poles of the permanent magnets are changed, so that the rotor 200 may be formed in 10 poles.

In this configuration, three hall sensors 30 may be spaced apart from each other by 30° with respect to the rotating center of the rotor along the circumferential direction. That is, a period in which one permanent magnet having an N pole disposed at an outer side and one permanent magnet having an S pole disposed at an outer side pass while the rotor 200 rotates 360° as a machine angle is repeated four times, a machine angle for one-time period of the 8-pole rotor becomes 360°/4=90°, and the machine angle of 90° for the one-time period corresponds to an electrical angle of 360°. Therefore, the machine angle of three hall sensors 300 disposed at a phase difference of 120° as an electrical angle with respect to the electrical angle of 360° may be 30°, so three hall sensors 300 may be spaced apart from each other by 30° in the circumferential direction.

The present invention is not limited to the above-mentioned exemplary embodiments but may be variously applied, and may be variously modified by those skilled in the art to which the present invention pertains without departing from the gist of the present invention claimed in the claims.

DETAILED DESCRIPTION OF MAIN ELEMENTS

1000: BLDC motor
100: Stator
110: Core
120: Teeth
121: Inner circumferential surface
140: Coil
150: Insulator 151: Seating groove
152: Extension
200: Rotor
210: Core
211: Outer circumferential surface
220: Permanent magnet
230: Rotation shaft
240: Bearing
h1, h2: Overhang part
300: Hall sensor
310: Hole PCB housing
311: Stopping plate
312: Insertion
320: Hole PCB
500: Housing

The invention claimed is:

1. A BLDC motor, comprising:
a stator provided with a plurality of teeth which extend toward an inner side of a core and have a coil wound therearound;
a rotor disposed at an inner side of the stator to be spaced apart from each other and having a plurality of permanent magnets coupled to a core thereof; and
hall sensors disposed while being spaced apart from each other to be opposite to an outer circumferential surface of the core of the rotor and disposed within a height range between both surfaces in a height direction of the core of the rotor to detect a change in a magnetic field in response to a rotation of the rotor,
wherein an upper surface of the stator in an axial direction, in which the hall sensors are disposed, is flat, and the hall sensors are disposed between an upper surface of the core of the rotor and the upper surface of the stator in the axial direction.

2. The BLDC motor of claim 1, wherein a central height of the core of the rotor is spaced apart from a central height of the core of the stator.

3. The BLDC motor of claim 2, wherein the central height of the core of the rotor is disposed to be spaced apart from the central height of the core of the stator in the same direction as a direction of an axial force which acts on the rotor.

4. The BLDC motor of claim 2, wherein the core of the stator is disposed within the height range between both surfaces in the height direction of the core of the rotor.

5. The BLDC motor of claim 1, further comprising:
an insulator coupled to the stator so that the insulator surrounds the stator to electrically insulate the stator,
wherein the insulator is provided with a seating groove in which the hall sensor may be disposed.

6. The BLDC motor of claim 5, further comprising:
a hall PCB housing which are disposed at an outer side of the coil in the height direction to be spaced apart from each other and are coupled to the insulator.

7. The BLDC motor of claim 6, further comprising:
a hall PCB which is coupled to an outer side of the hall PCB housing in the height direction and is provided with the hall sensor.

8. The BLDC motor of claim 5, wherein a stopping plate is provided to stop a gap between the outer circumferential surface of the core of the rotor and the hall sensor.

9. The BLDC motor of claim 8, wherein the stopping plate is integrally formed with the hall PCB housing.

10. The BLDC motor of claim 1, wherein ten permanent magnets are spaced apart from each other by a predetermined angle along the circumferential direction, so the rotor is formed in 10 poles, and
three hall sensors are spaced apart from each other by 24° along the circumferential direction.

11. The BLDC motor of claim 1, wherein eight permanent magnets are spaced apart from each other by a predetermined angle along the circumferential direction, so the rotor is formed in 8 poles, and
three hall sensors are spaced apart from each other by 30° along the circumferential direction.

* * * * *